(12) United States Patent
Bentley et al.

(10) Patent No.: US 7,140,028 B2
(45) Date of Patent: *Nov. 21, 2006

(54) SYSTEM AND METHOD FOR BUILDING A TARGET OPERATING SYSTEM FROM A SOURCE OPERATING SYSTEM

(75) Inventors: Keith C. Bentley, Kirkland, WA (US); Sander B. Bogdan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 174 days.

This patent is subject to a terminal disclaimer.

(21) Appl. No.: 10/970,875

(22) Filed: Oct. 22, 2004

(65) Prior Publication Data

US 2005/0055600 A1    Mar. 10, 2005

Related U.S. Application Data

(63) Continuation of application No. 09/883,120, filed on Jun. 15, 2001, now Pat. No. 6,907,610.

(51) Int. Cl.
*G06F 9/00* (2006.01)
(52) U.S. Cl. ..................................................... 719/319
(58) Field of Classification Search .................. 709/319
See application file for complete search history.

(56) References Cited

U.S. PATENT DOCUMENTS

| | | | |
|---|---|---|---|
| 5,325,533 A | 6/1994 | McInerney et al. | |
| 5,353,411 A | 10/1994 | Nakaosa et al. | |
| 5,548,759 A | 8/1996 | Lipe | |
| 5,901,319 A * | 5/1999 | Hirst | 717/164 |
| 5,991,794 A | 11/1999 | Hodges et al. | |
| 6,138,271 A | 10/2000 | Keeley | |
| 6,298,481 B1 | 10/2001 | Kosaka et al. | |
| 6,324,637 B1 | 11/2001 | Hamilton | |
| 6,571,285 B1 | 5/2003 | Groath et al. | |
| 6,640,255 B1 | 10/2003 | Snyder et al. | |
| 6,742,180 B1 * | 5/2004 | Ritz | 717/174 |
| 2003/0058280 A1 | 3/2003 | Molinari | |
| 2003/0192027 A1 | 10/2003 | Porter | |

OTHER PUBLICATIONS

Benso et al., A software development kit for dependable applications in embedded systems, Oct. 3-5, 2000, IEEE, pp. 170-178.
Kiczales et al., The need for customizable operating systems, Oct. 14-15, 1993, IEEE, pp. 165-169.
Loucks et al., A microkernel-based operating system for personal digital assistants, Oct. 14-15, 1993, IEEE, pp. 9-13.

* cited by examiner

*Primary Examiner*—William Thomson
*Assistant Examiner*—LeChi Truong
(74) *Attorney, Agent, or Firm*—Lee & Hayes, PLLC

(57) ABSTRACT

System and methods are described herein for determining which components of a source operating system are required to be included in a target operating system to support selected source operating system features in the target operating system. Data objects are constructed to represent each component and feature of the source operating system, each data object identifying Exports and References for the component or feature it represents. The dependency model identifies, for each component, other components that must be included in a target operating system having the component. A target operating system builder program receives input from a user as to the features the user desires to include in the target operating system. The dependency model is utilized to identify and select the components from the source operating system necessary to support the selected features. The selected components are then linked to create the target operating system.

30 Claims, 6 Drawing Sheets

SYSTEM AND METHOD FOR BUILDING A TARGET OPERATING SYSTEM FROM A SOURCE OPERATING SYSTEM

RELATED APPLICATIONS

This is a continuation of application Ser. No. 09/883,120, filed Jun. 15, 2001 now U.S. Pat. No. 6,907,610, entitled "System And Method For Building A Target Operating System From A Source Operating System", which is hereby incorporated by reference herein.

TECHNICAL FIELD

The systems and methods described herein generally relate to building a target computer operating system. More particularly, the systems and methods described herein relate to building a target operating system from a set of source operating system components.

BACKGROUND

An embedded or appliance computing device typically provides a smaller set of features compared to a general-purpose computer. For such devices, it is desired that a more compact operating system, tailored to the defined set of features be used, as opposed to using a general-purpose operating system. Although conventional comprehensive operating systems can be used to drive such embedded/appliance devices, providing the memory and processing power for such operating systems burdens the device manufacturers with expensive overhead that is unnecessary for their product. An ideal solution would be to allow manufacturers of special purpose electronic devices to choose desired features from a comprehensive source operating system to include in a target operating system, and then to build the target operating system that provides only those features that have been chosen. Doing so would allow the device to be smaller and less expensive, thereby making the device more attractive to consumers.

The problem with such a solution, however, is that operating systems are complex programs comprised of a multitude of components. Some components export data or functionality to other components. Some components cannot function properly unless other components are present to provide data or functionality to them. In addition, features of an operating system typically do not map directly to the various components of the operating system. These interdependencies among components of an operating system and the fact that operating system features do not map directly to operating system components provide an obstacle to building a target operating system simply by first selecting features from a source operating system and then building the target operating system from the source operating system based on the selected features. Typically, implementation of a particular feature of an operating system depends on more than one component of the operating system. Furthermore, one component may be required by more than one feature.

Therefore, given a subset of all the features of a source operating system, there is a problem of how to select an appropriate set of operating system components that are necessary to implement the desired feature subset in a target operating system.

SUMMARY

Methods and systems are described that provide for selection of an appropriate set of components from a source operating system to build a target operating system according to a particular subset of features from the source operating system that is to be provided by the target operating system. In building the target operating system from the source operating system, the appropriate set of components are first selected from the source operating system and are then properly linked to provide the target operating system.

More specifically, in one implementation described herein, each object of a source operating system is represented as a data object that has the following attributes (as used herein, an object refers to (1) a component of the operating system, or (2) a set of components of the operating system that operate to provide a particular feature of the operating system):

1) Name;
2) Type;
3) Exports;
4) Hard References;
5) Soft References; and
6) Independent Links.

A Name and Type are used to uniquely identify the data object. Exports are the data provided by this data object to other data objects. A data object may have from zero to hundreds of Exports.

References are further identified as Hard References or Soft References. A Hard Reference is a critical Reference (for example, but not limited to, data to be received by this data object from another data object) that must be resolved for a feature provided by this data object to function properly. Conversely, a Soft Reference is a non-critical Reference that is not required to be resolved for the feature provided by this data object to function properly. Identification of Soft References is used to identify the components from the source operating system that may be omitted when building the target operating system.

An Independent Link is a set of Exports and References that are not merged into the Exports and References of its containing data object. For example, an API (application programming interface) set function table lists every function that is available in the API set. The table itself is contained in one component but references many other objects. Using only the Export and Reference attributes of the containing data object would cause every component referenced in the table to be selected. In this case, Independent Links are used in the containing data object to identify the table entries as independent Exports and References. Using Independent Links, the table entries can be exported or referenced independently of one another.

Independent Links are also used in order to model choices that need to be made when selecting the desired features to be used in the target operating system. This is described in greater detail below.

After data objects representing the components of the source operating system are created, a master dependency graph is constructed by connecting each Reference to the Export that resolves the Reference. Features required by the target operating system are then selected. Beginning with the selected features, links in the dependency graph are traced and components that are encountered are marked to be included in the target operating system. After the links have been traversed, the marked components are combined to create the target operating system.

This summary itself is not intended to limit the scope of this patent. For a better understanding of the present invention, reference should be made to the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth one or more specific embodiments of systems and methods that utilize dependency modeling to provide a way to build a target operating system from a source operating system. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods that utilize dependency modeling to provide a way to build a target operating system from a source operating system. Applicants intend these exemplary implementations to be examples only. Applicants do not intend these exemplary implementations to limit the scope of the claimed present invention. Rather, Applicants have contemplated that the claimed present invention might also be embodied and implemented in other ways, in conjunction with other present or future technologies.

Introduction

The dependency modeling discussed herein will be described with reference to an operating system that is built as a number of static libraries. More particularly, the present discussion will focus on and use the WINDOWS CE operating system produced by MICROSOFT CORP. as an example. Although other operating systems may or may not exhibit the same or similar features, characteristics or behavior as the WINDOWS CE operating system, it will be clear to those skilled in the art that the dependency modeling described herein may be applied with other operating systems to model dependencies and, as a result, build target operating systems that are a subset of the components of a source operating system. Use of the WINDOWS CE operating system as an example to describe the present invention is not intended to limit the scope of the appended claims to a particular operating system.

As previously stated, the WINDOWS CE operating system is built as a number of static libraries. Each static library is constructed by compiling one or more source code files into object files and then linking the object files to form the static library. Each source file, when compiled and operating in a computer, provides one or more functions, each function referencing from zero to several other functions.

Figure 1:
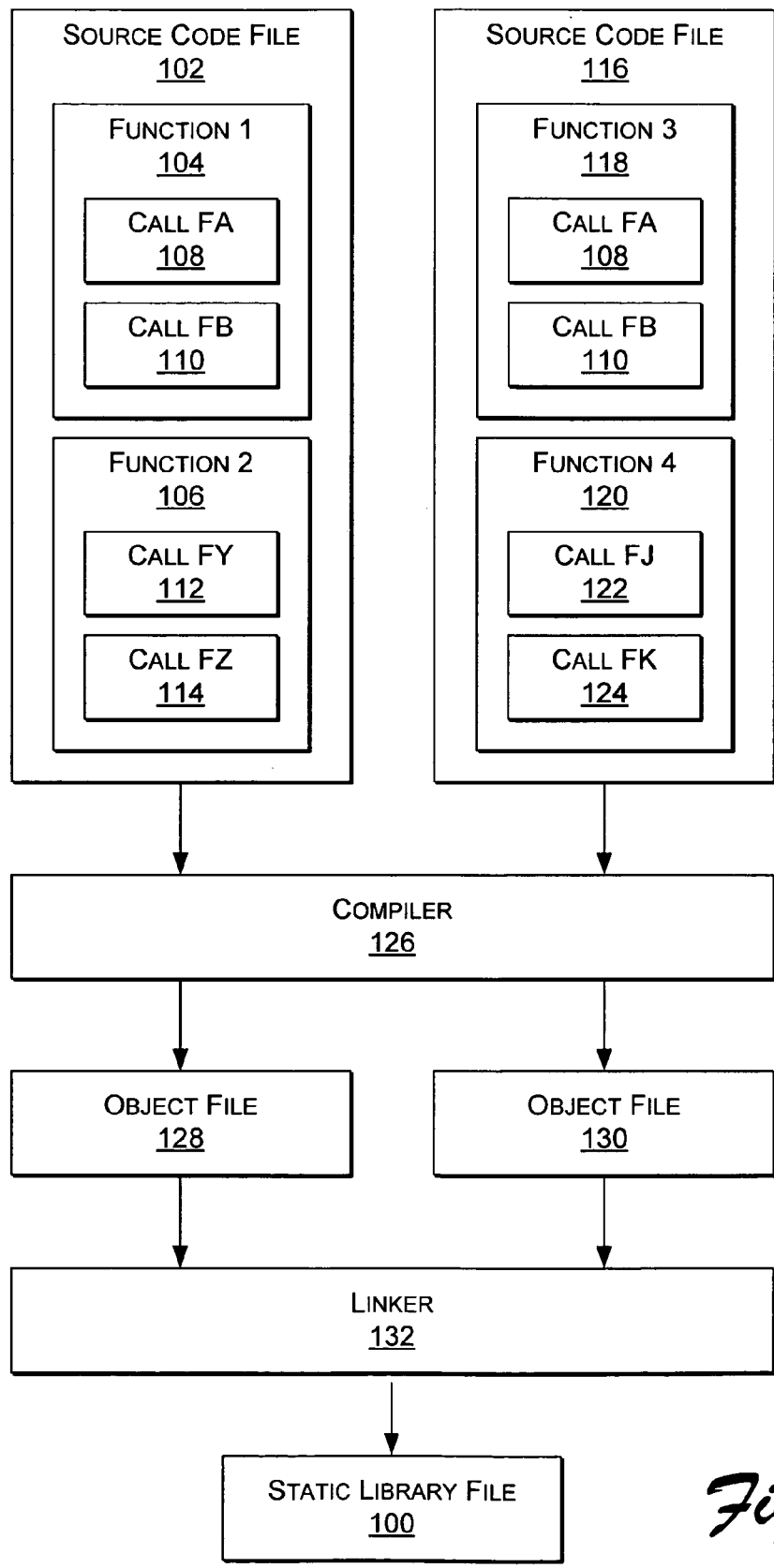
FIG. 1 is a block diagram of a static library and the components thereof.

FIG. 1 is a simplified block diagram of a static library 100 and components that are utilized in building the static library 100. Source code file 102 includes Function 1 104 and Function 2 106. Function 1 104 references Function A 108 and Function B 110. Function 2 106 references Function Y 112 and Function Z 114. Source code file 116 includes Function 3 118 and Function 4 120. Function 3 118 references Function A 108 and Function B 110. Function 4 120 references Function J 122 and Function K 124.

Source code file 102 and source code file 116 are compiled by compiler 126 to form object file 128 and object file 130, respectively. Object file 128 contains encoded information about Function 1 104 and Function 2 106. Object file 130 contains encoded information about Function 3 118 and Function 4 120. Object file 128 and object file 130 are linked by linker 132 to form the static library 100. The static library 100 thereby contains encoded information from object file 128 and object file 130. The static library 100 is used in a source operating system (not shown).

It can be seen that the Export and Reference information from the individual source files 102, 116 is merged into the static library 100. This is similar to how the linker 132 arranges information in the static library 100. For dependency modeling, each of several static libraries in a source operating system has a corresponding Export/Reference data object associated therewith. The information contained in the data objects can be used to identify the other data objects that are necessary to support particular features of an operating system.

The determination of which components of a source operating system are required to build a target operating system with particular features of the source operating system is accomplished in three basic steps: construction, connection and selection.

A data object describing Export and/or Reference information for a component is first constructed for each component of the source operating system. It is noted that, although the present discussion will focus on a component as being a static library, in general a component may be any section of code or 'container' that can be separated from other code without undue burden. Data objects are also constructed for the features of the operating system.

Next, a master dependency graph, or model, is constructed by connecting each Reference to an Export that resolves the Reference. Finally, starting from desired components, functions, or a combination of desired components and function that are required by the user, the dependency model is traced to select the components (for example, static libraries in the case of Windows CE) that are required to build the desired target operating system that contains a subset of the features of the source operating system.

A problem with the simple model suggested above is that it will almost always result in selection of all the components from the source operating system because selection of one static library will result in identification of References that can only be resolved by selection of more static libraries until, eventually, all static libraries are selected. This problem is resolved with the introduction of Soft References and "Choice" data objects. Soft References are non-critical References, i.e., References that do not have to be resolved to have a working, albeit functionally reduced, system. Soft References—which will be described in more detail below—are the basic mechanism by which source operating system components can be omitted from the target operating system. When necessary, References will be described as either Hard References or Soft References.

One problem that arises when constructing a dependency graph is when alternative options are provided for a feature. For example, some devices may have a mouse while other devices may have a touch screen. The source operating system includes a mouse cursor and a touch screen cursor, but each target operating system may require one or the other. On devices that have a mouse, a mouse cursor would be chosen to configure the target operating system. On devices that have a touch screen, a touch screen cursor would be used. A dependency graph cannot be completed until it is known which option will be required by the target operating system.

For such cases, provision is made for alternative options by referencing the alternatives in a data object of type "Choice." A "Choice" data object allows alternative configurations to be modeled prior to the configuration of the system, thereby allowing a complete dependency model to be constructed before one or more alternative choices must be made for a particular configuration.

To accomplish this, the alternative options are made Independent Links in the "Choice" data object. In such an implementation, the Exports of the respective choices are made the Exports of the "Choice" data object. (The References will be the same for each alternative). Explicitly modeling the choice allows the construction of a dependency model of the entire system independently of the features selected by the user.

To explain Soft References more fully, assume in the present example that neither Function K 124 nor Function Z 114 are critical requirements for functionality of the static library 100. In such a circumstance, Function K 124 and Function Z 114 would be identified as non-critical components in the construction and/or connection phase, and those functions would not be selected in the selection phase to be included in the target operating system.

A more concrete example is found in the WINDOWS CE operating system. In this operating system, which can be used as a source operating system to build a target operating system, the system objects (known as "windows") serve a dual purpose. They provide a mechanism to display graphics externally on a computer monitor and they provide a destination for messages to be sent when writing programs to run on the operating system. Some products do not need the graphics capability of the operating system, and a device manufacturer may prefer to leave it out of the target operating system since it would not be used. More specifically, the source code to create a window makes a specific call to the graphics subsystem, GweNewGdiWindow, to notify it when a window is created. If this call were a Hard Reference, the graphics subsystem would always be pulled into the final configuration of the target operating system. By designating this call a Soft Reference, the code for the graphics subsystem will not be pulled into the final configuration of a target operating system just because windows code is being used in the target operating system.

While this solution solves the problem of how to identify components to leave out of a target operating system, another problem arises due to the fact that there are a number of places in an operating system that contain what are essentially renaming tables. For example, an API (application programming interface) set function table lists every function that is available in the API set. The table itself is contained in one component but references objects in many other components. Using the simple scheme described above to merge the References causes problems. Leaving the function References as Hard References will cause every component to be pulled into the target operating system, which is not the desired behavior. On the other hand, designating those References as Soft References is not appropriate since the functions do need to be in the target operating system if they are needed.

The concept of Independent Links, described above, is used to solve this particular problem. The solution to this problem is to refrain from merging the information in the table into the rest of the Exports and References of the data object. The Export/Reference links in the table remain independent.

Figure 2:
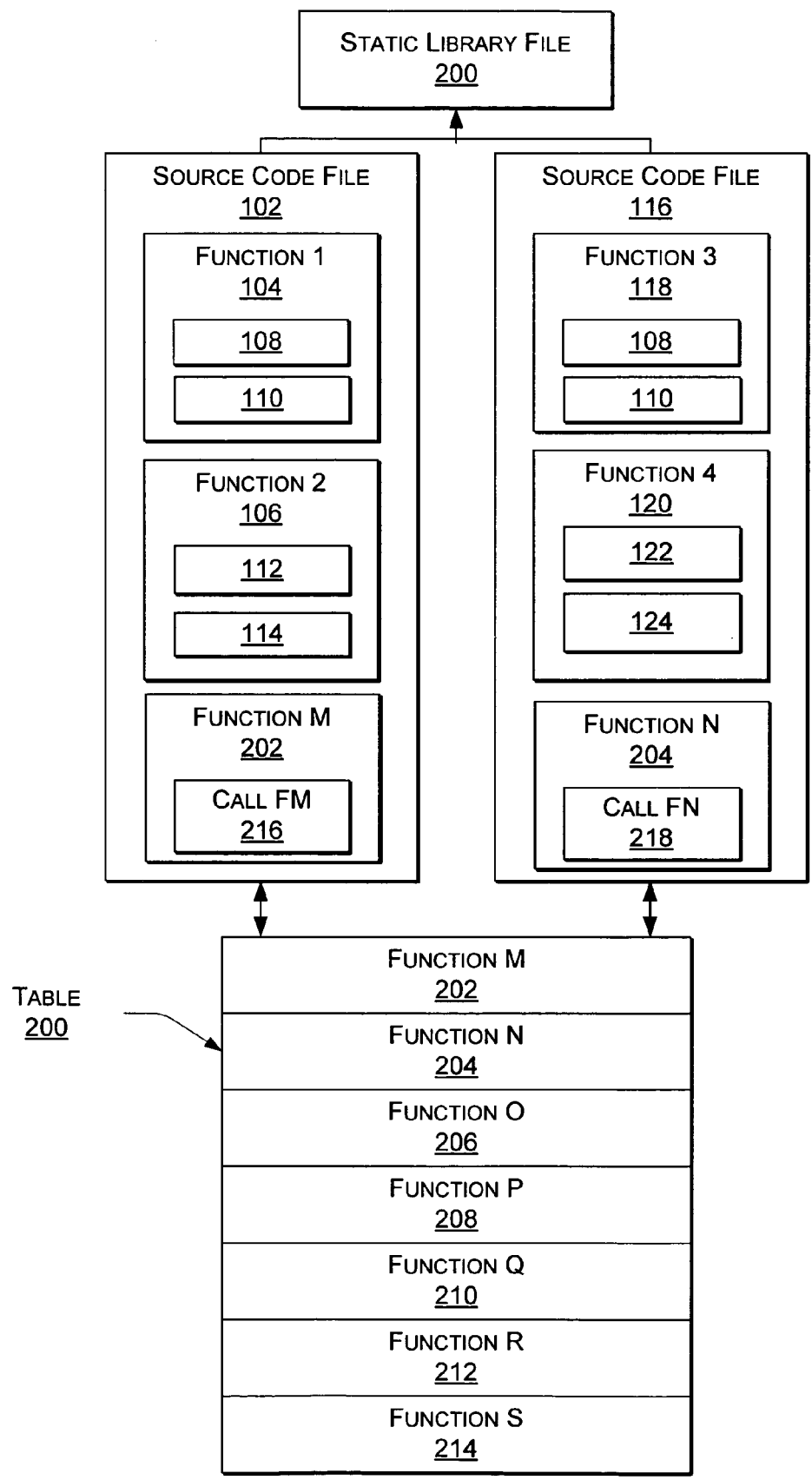
FIG. 2 is an illustration of a data object shown in accordance with the present invention.

FIG. 2 is a block diagram of source code file 102 and its components, and source code file 116 and its components from FIG. 1. In addition, FIG. 2 shows a table 200 having several entries: Function M 202, Function N 204, Function O 206, Function P 208, Function Q 210, Function R 212, and Function S 214. Source code file 102 includes Function M 202 that includes a call 216 to the Function M 202 entry of the table 200. Source code file 116 includes Function N 204 that includes a call 218 to the Function N 204 of the table 200. Source code file 102 and source code file 116 are compiled and linked to create static library 220.

According to the present invention, only the specific entries (Function M 202 and Function N 204) are selected from the table, rather than selecting all the functions (202–214) in the table. This significantly reduces the size of the target operating system. The use of Independent Links will be described in greater detail below, with continuing reference to the remaining figures.

Exemplary Data Structure

Figure 3:
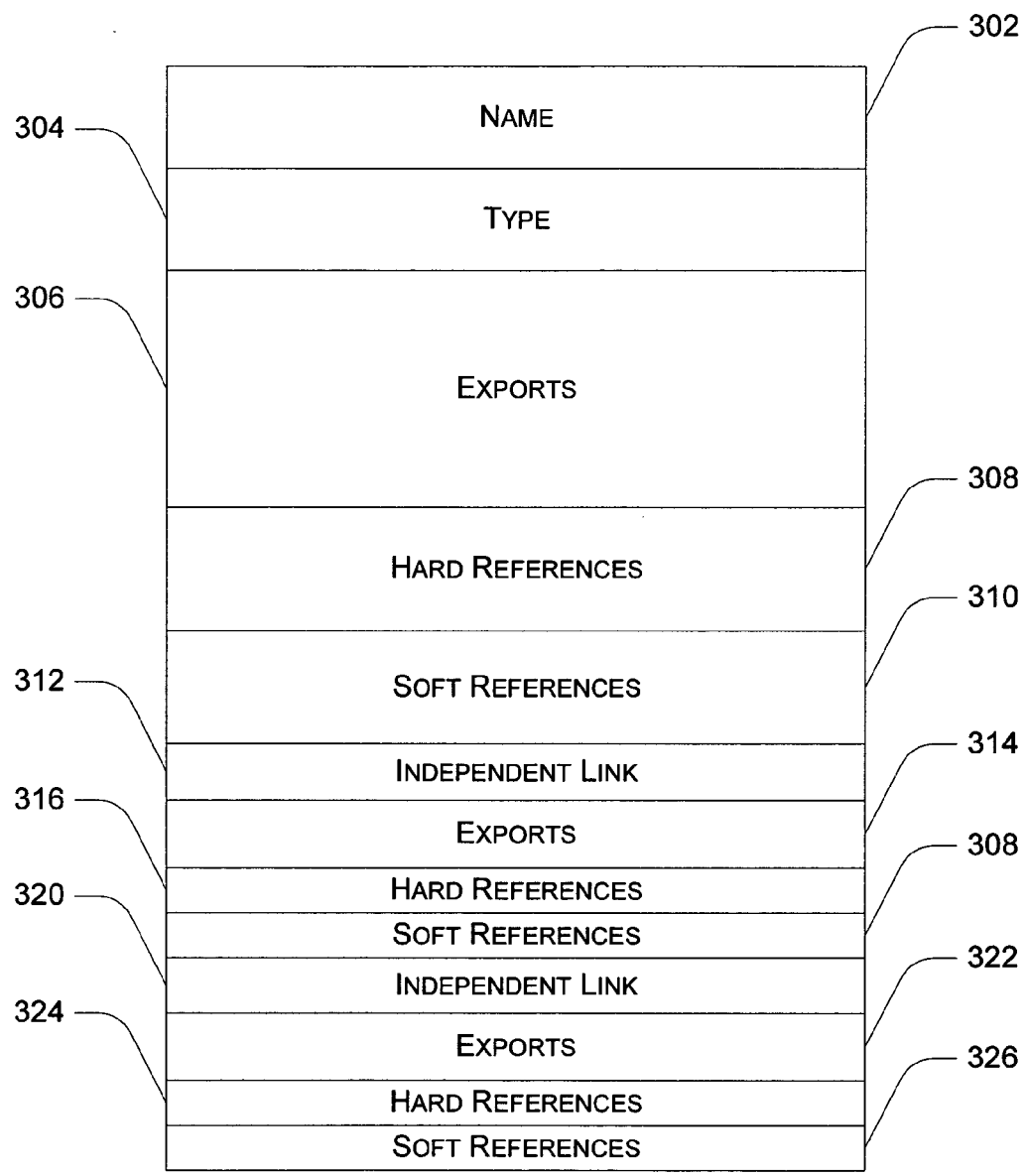
FIG. 3 is a block diagram of a static library and the components thereof, including a reference table.

FIG. 3 is a block diagram depicting a data structure that can be used to represent a source operating system component. Shown in FIG. 3 is a data object 300 having a Name field 302 and a Type field 304. The data object 300 also includes an Exports field 306, a Hard References field 308 and a Soft References field 310. The Exports field 306 may contain from zero to hundreds of members to indicate data output by the source operating system component represented by the data object 300. Likewise, the Hard References field 308 and the Soft References field may contain from zero to hundreds of members to indicate data referenced by the source operating system component represented by the data object 300.

The data object 300 is shown with a first Independent Link 312, which has an Exports field 314, a Hard References field 316 and a Soft References field 318. The data object 300 also includes a second Independent Link 320, which has an Exports field 322, a Hard References field 324 and a Soft References field 326.

Referring back to FIG. 2, a data object constructed to represent static library 200 would be represented according to data object 300 as follows:
Name (302): Component
Type (304): Static Library
Exports (306):
Function 1
Function 2
Function 3
Function 4
Hard References (308):
Function A
Function B
Function Y
Function J Soft References (310):
  Function K
  Function Z
Independent Link (312):
  Exports (314):
    API Entry M
  Hard References (316):
    Function M
Independent Link (320):
  Exports (322):
    API Entry N
  Soft References (324):
    Function N (Note that, for exemplary purposes only, Function M is a Hard Reference and Function N is a Soft Reference).

The data objects that represent source operating system components and features may be constructed in any practical manner including, but not limited to, manually creating the data objects, using existing information derived from software tools to automatically create the data objects, etc. How the data objects are created is not the focus of the present application, only that they are created to represent features and components of the source operating system.

Exemplary Target Operating System Building System

Figure 4:
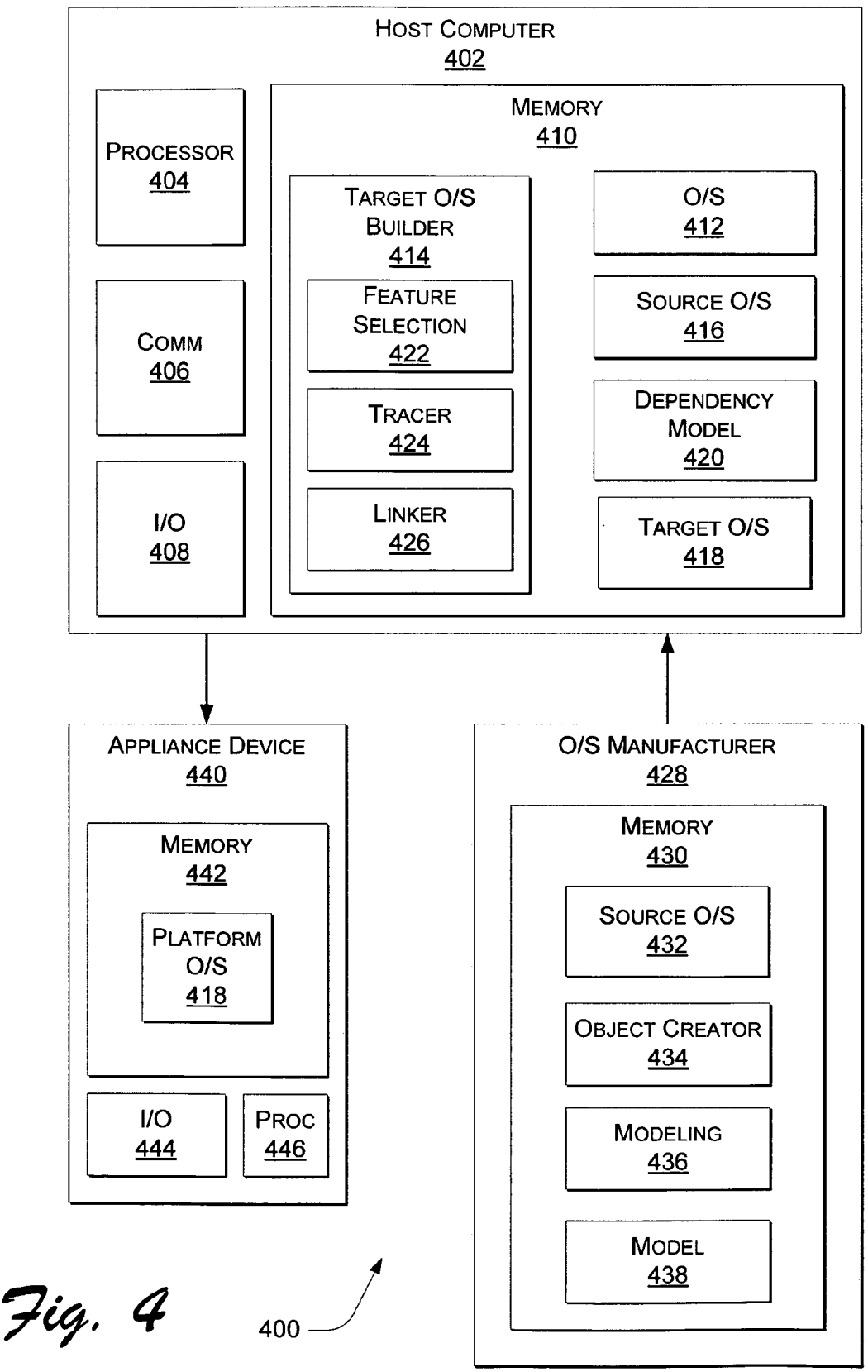
FIG. 4 is a block diagram of a system in which the present invention may be implemented.

FIG. 4 shows an exemplary target operating building system 400 for constructing a target operating system for an embedded/applicant device from a source operating system. A host computer 402 includes a processor 404, a communications module 406, and input/output (I/O) module 408, and memory 410. The memory 410 stores an operating system 412, a target operating system builder program 414 and a source operating system 416. The operating system 412 is used to operate the host computer 402 and the source operating system 416 is an operating system containing all possible components from which a target operating system 418 may be built. The target operating system 418 is stored in the memory 410 as it is constructed. The memory 410 also stores a dependency model 420 that is used to construct the target operating system 418. The target operating system builder program 414 includes a feature selection module 422, a tracer 424 and a linker 426.

Also shown in FIG. 4 is an operating system (O/S) manufacturer 428. The O/S manufacturer 428 includes memory 430, which stores a source operating system 432, an object creator 434, a modeling module 436 and a dependency model 438. The object creator 434 is configured to create a data object for each component in the source operating system 432. The modeling module 436 utilizes the data objects to construct the dependency model 438. The source operating system 432 and the dependency model 438 are then transferred to the host computer 402 (as source operating system 416 and dependency model 420).

The target operating system 418, after being created on the host computer 402, is loaded into an appliance device 440. The appliance device 440 includes memory 442, an input/output module 444 and a processor 446.

Continuing reference will be made to the features and reference numerals of FIG. 4 as the discussion of the methodological implementation of the target operating system building system 400 progresses.

Methodological Implementation of the Target O/S Building System

Figure 5:
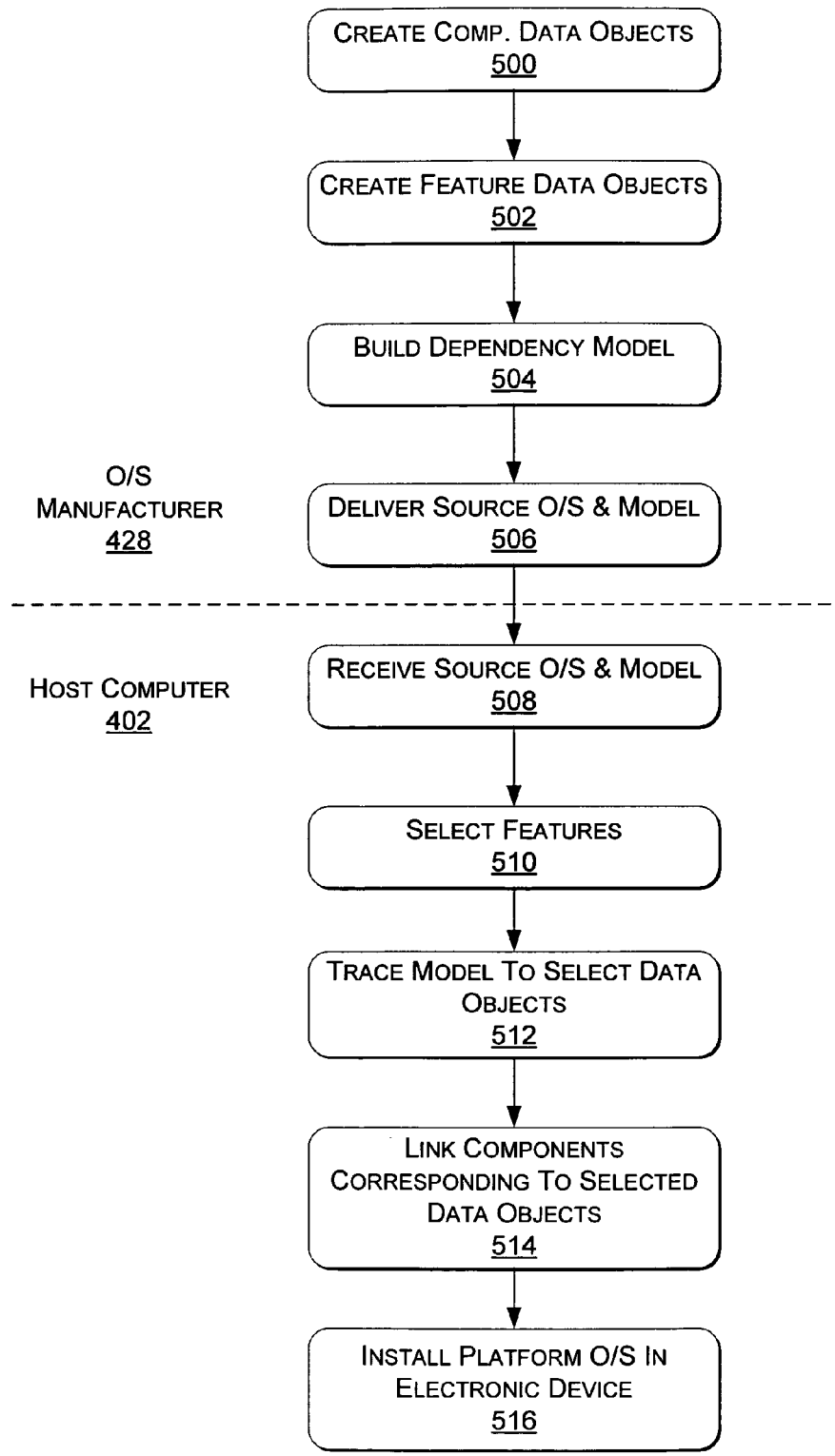
FIG. 5 is a flow diagram showing a methodological implementation of the system of FIG. 4.

FIG. 5 shows a methodological implementation of the target operating system building system 400 shown in FIG. 4. This methodological implementation may be performed in software, hardware, or a combination thereof. Continuing reference will be made to the features and reference numerals of FIG. 4 in the discussion of FIG. 5.

The methodological implementation shown in FIG. 5 is shown in blocks representing acts that occur at the O/S manufacturer 428 and at the host computer 402. Blocks 500–506 will be shown as being performed at the O/S manufacturer 428. Blocks 508–516 are shown as being performed at the host computer 402. It is noted, however, that the delineation and distribution of the necessary tasks may be performed at either the host computer 402 or the O/S manufacturer 428, or at another unit. FIG. 5 merely depicts one implementation that may be used.

At block 500, data objects are created for each component in the source operating system 432 by the object creator 434 according to the Exports, Hard References, Soft References and Independent Links as described above. Data objects are also created for features and choices of the source operating system 432 (block 502). A data object created for an operating system feature may simply represent an operating system component or it may represent a set of components. The initial mapping of features to components may be accomplished in various ways and those skilled in the art will recognize the advantages and disadvantages of particular implementations.

At block 504, the modeling module 436 creates a dependency model 438 using the data objects created at block 500 and block 502. The source operating system 432 and the dependency model 438 are delivered to the host computer 402 at block 506. This may be accomplished by any known method, such as via the Internet, CD-ROM, floppy diskette, etc. Furthermore, the source operating system 432 and the dependency model 438 do not necessarily have to be delivered to the host computer 402 as long as the host computer 402 has access to the source operating system 432 and the dependency model 438.

At block 508, the host computer 402 receives the source operating system 432 and the dependency model 438 from the O/S manufacturer 428. The target operating system builder program 414 provides a user interface (not shown) through the feature selection module 422 to allow a user to select the desired features for the target operating system (block 510). Features may include, but are not limited to, a basic operating system kernel, file system, file system add-ons, device drivers, windows manager, graphics, communication protocol stacks, and the like. In one implementation, the user is provided with a menu from which the user may select desired features.

The tracer 424 identifies the selected features and traces the dependency model 420 to select the required data objects at block 512. When choice data objects are encountered, the tracer will need to determine which choice alternative has been selected. This determination may be made in a number of ways, including, but not limited to, prompting the user for an alternative or retrieving a previously selected alternative. Graph tracing and selection algorithms are well known in the art and any known method may be used to trace the Hard References to the Exports that resolve them and select the data object that contains the Export. After the data objects are selected, the linker 426 links the components represented by the selected data objects at block 514 to create the target operating system 418. At block 516, the target operating system 418 is installed in the memory 442 of the appliance device 440.

Exemplary Computing System and Environment

Figure 6:
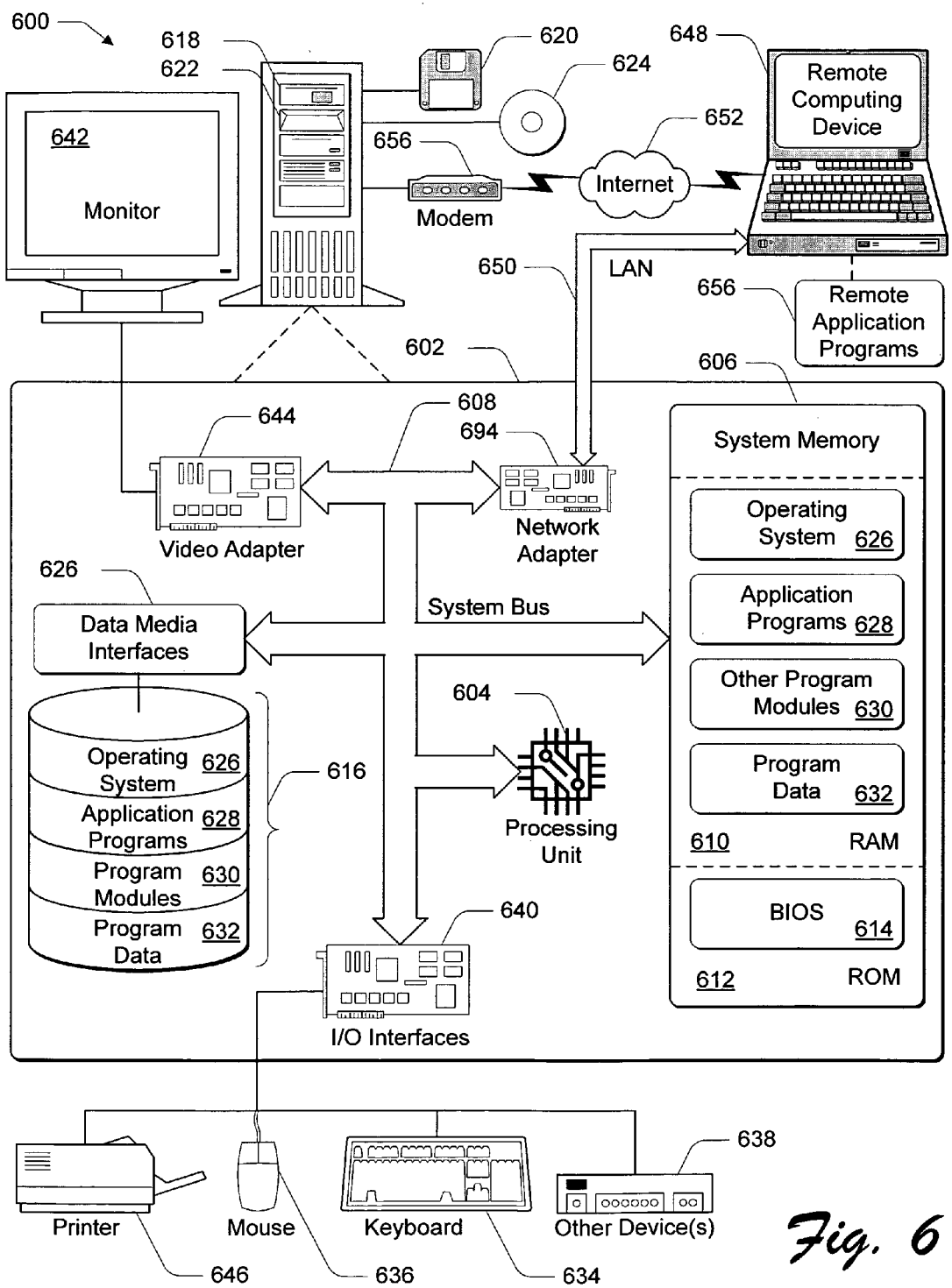
FIG. 6 is a example of a computing operating environment capable of implementing the present invention claimed herein.

FIG. 6 illustrates an example of a suitable computing environment 600 within which an exemplary target operating system building system, as described herein, may be implemented (either fully or partially). The computing environment 600 may be utilized in the computer and network architectures described herein.

The exemplary computing environment 600 is only one example of a computing environment and is not intended to suggest any limitation as to the scope of use or functionality of the computer and network architectures. Neither should the computing environment 600 be interpreted as having any dependency or requirement relating to any one or combination of components illustrated in the exemplary computing environment 600.

The exemplary target operating system building system may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary audio recognizer may be described in the general context of computer-executable instructions, such as program modules, being executed by a computer. Generally, program modules include routines, programs, objects, components, data structures, etc. that perform particular tasks or implement particular abstract data types. Exemplary audio recognizer may also be practiced in distributed computing environments where tasks are performed by remote processing devices that are linked through a communications network. In a distributed computing environment, program modules may be located in both local and remote computer storage media including memory storage devices.

The computing environment 600 includes a general-purpose computing device in the form of a computer 602. The components of computer 602 can include, by are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of a digital audio signal hashing unit, a watermark encoder, transformer, a statistics estimator, an adaptive quantizer, an error-correction decoder, and a hasher.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Computer-Executable Instructions

An implementation of a system and or method for building target operating systems from a source operating system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 600 in which a system and/or method of building a target operating system from a source operating system may be implemented. Specifically, the systems and methods described herein may be implemented (wholly or in part) by any program modules 628–630 and/or operating system 628 in FIG. 6 or a portion thereof.

The operating environment is only an example of a suitable operating environment and is not intended to suggest any limitation as to the scope or use of functionality of the systems and methods described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer-Readable Media

An implementation of a system and/or method for building a target operating system from a source operating system may be stored on or transmitted across some form of computer readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable storage media comprising computer-executable instructions for building a target operating system from a source operating system that, when executed on a computer, perform the following:

creating a data object for each of multiple components of the source operating system, wherein the data object comprises:
 an Export field for storing data to identify component outputs;
 a Hard References field for storing data to identify component inputs that are necessary for the operation of the target operating system; and
 a Soft References field for storing data to identify component inputs that are not necessary for operation of the target operating system;

generating a dependency model using the data objects;

identifying features in the source operating system to be included in the target operating system;

selecting components necessary to support the identified features by tracing dependencies according to the dependency model; and linking the selected components to build the target operating system.

2. The one or more computer-readable media as recited in claim 1, wherein the data object further comprises an Independent Links field for storing data to identify Exports, Hard References and Soft References to or from a table entry.

3. The one or more computer-readable media as recited in claim 1, wherein the data object further comprises a Name and a Type.

4. The one or more computer-readable media as recited in claim 3, wherein the data object further comprises a Type designated as "Choice," and wherein the Choice data object comprises at least two Independent Links, each Independent Link being an alternative choice of configurations.

5. The one or more computer-readable media as recited in claim 1, wherein the generating a dependency model further comprises generating a model by connecting each unresolved data object Reference to an Export that resolves the Reference until no more unresolved References can be resolved.

6. The one or more computer-readable media as recited in claim 5, wherein only Hard References are resolved.

7. The one or more computer-readable media as recited in claim 1, the computer-executable instructions further performing the following:

creating a data object for each of multiple features of the source operating system; and including the feature data objects in the dependency model.

8. One or more computer-readable storage media comprising computer-executable instructions for building a target operating system from a source operating system that, when executed on a computer, perform the following:

creating a data object for each of multiple components of the source operating system;

generating a dependency model using the data objects;

identifying features in the source operating system to be included in the target operating system;

selecting components necessary to support the identified features by tracing dependencies according to the dependency model, wherein the selecting components further comprises:

selecting a set of one or more components required to support a feature to be included in the target operating system;

identifying a set of data objects that represent the set of components;

for each unresolved Reference in each data object in the set of data objects, tracing the unresolved Reference to a data object Export that resolves the Reference; and selecting the component that corresponds to the data object that contains the Export; and linking the selected components to build the target operating system.

9. The one or more computer-readable media as recited in claim 8, wherein the tracing and selecting are only performed for References that are Hard References.

10. One or more computer-readable storage media comprising computer-executable instructions for building a target operating system from a source operating system by:

identifying features in the source operating system to include in the target operating system;

utilizing a dependency model that maps operating system features to operating system components to select components from the source operating system that support the identified features; and linking the selected components to create the target operating system;

wherein:

the dependency model includes a data object for each component in the source operating system, each data object potentially having one or more Exports that provide data to at least one other component, and one or more Hard References that use data from at least one other component; and the utilizing the dependency model to select components from the source operating system further comprises:

identifying a selection of an operating system feature;

identifying one or more first operating system components mapped from the selected feature;

for each identified first operating system component, tracing each Hard Reference from the identified component to a component Export from a second operating system component that resolves the Hard Reference and selecting the second operating system component;

if the second operating system component includes one or more Hard References then, for each Hard Reference, tracing the Hard Reference from the second operating system component to a component Export from a third operating system component that resolves the Hard Reference and selecting the third operating system component; and repeatedly tracing Hard References and selecting components in a like manner until all Hard References from all components have been resolved and the components that contain the Hard References and the Exports that resolve them have been selected.

11. The one or more computer-readable media as recited in claim 10, wherein the Hard References are References that reference data from at least one other component that is critical to the function of the component represented by the data object in which the Hard Reference is included, and each data object potentially having one or more Soft References that are References that reference data that is not critical to the function of the component represented by the data object in which the Soft Reference is included.

12. A method implemented at least in part by a computer comprising:

identifying a selected feature of a source operating system to be included in a target operating system;

identifying one or more first source operating system components that are associated with the selected feature, the one or more first source operating system components being required for the selected feature to function properly;

selecting the one or more first source operating system components;

identifying one or more second source operating system components that are required for the one or more first source operating system components to function properly;

selecting the one or more second source operating system components; and linking the selected source operating system components to form a target operating system;

wherein:

each source operating system component is represented by a data object;

a data object further comprises:

a Name;

a Type;

one or more Exports that identify a source operating system component or components, if any, that requires data from the source operating system component represented by the data object;

one or more Hard References that identify a source operating system component or components, if any, that provides critical data to the source operating system component represented by the data object; and the identifying first and second source operating system components further comprises using a dependency model to trace each Hard Reference from a first data object that represents a first source operating system component to an Export from a second data object that represents a second source operating system component to identify the second source operating system component.

13. The method as recited in claim 12, the data object further comprising one or more Soft References, each Soft Reference identifying a source operating system component that provides data to the data object, the data provided to the data object being non-critical to the functioning of the source operating system component represented by the data object.

14. The method as recited in claim 12, the data object further comprising one or more Independent Links that each identifies a Reference and/or Export that is contained in a data structure that includes more than one Reference and/or Export.

15. The method as recited in claim 12, wherein the dependency model includes all the data objects that represent the source operating system components, and wherein each Hard Reference of each data object is logically connected to a data object Export that resolves the Hard Reference.

16. A computer system for building a target operating system from a source operating system, the system comprising:

means for creating a data object for each of multiple components of the source operating system, wherein the data object comprises:

an Export field for storing data to identify component outputs;

a Hard References field for storing data to identify component inputs that are necessary for the operation of the target operating system; and a Soft References field for storing data to identify component inputs that are not necessary for operation of the target operating system;

means for generating a dependency model using the data objects;

means for identifying features in the source operating system to be included in the target operating system;

means for selecting components necessary to support the identified features by tracing dependencies according to the dependency model; and means for linking the selected components to build the target operating system.

17. The system as recited in claim 16, wherein the data object further comprises an Independent Links field for storing data to identify Exports, Hard References and Soft References to or from a table entry.

18. The system as recited in claim 16, wherein the data object further comprises a Name and a Type.

19. The system as recited in claim 18, wherein the data object further comprises a Type designated as "Choice," and wherein the Choice data object comprises at least two Independent Links, each Independent Link being an alternative choice of configurations.

20. The system as recited in claim 16, wherein the means for generating a dependency model further comprises means for generating a model by connecting each unresolved data object Reference to an Export that resolves the Reference until no more unresolved References can be resolved.

21. The system as recited in claim 20, wherein only Hard References are resolved.

22. The system as recited in claim 16, further comprising:

means for creating a data object for each of multiple features of the source operating system; and means for including the feature data objects in the dependency model.

23. A computer system for building a target operating system from a source operating system, the system comprising:

means for creating a data object for each of multiple components of the source operating system;

means for generating a dependency model using the data objects;

means for identifying features in the source operating system to be included in the target operating system;

means for selecting components necessary to support the identified features by tracing dependencies according to the dependency model, wherein the means for selecting components further comprises:

means for selecting a set of one or more components required to support a feature to be included in the target operating system;

means for identifying a set of data objects that represent the set of components;

means for, for each unresolved Reference in each data object in the set of data objects, tracing the unresolved Reference to a data object Export that resolves the Reference; and means for selecting the component that corresponds to the data object that contains the Export; and means for linking the selected components to build the target operating system.

24. The system as recited in claim 23, wherein the means for tracing and the means for selecting perform the tracing and selecting only for References that are Hard References.

25. A computer system for building a target operating system from a source operating system, the system comprising:

means for identifying features in the source operating system to include in the target operating system;

means for utilizing a dependency model that maps operating system features to operating system components to select components from the source operating system that support the identified features; and means for linking the selected components to create the target operating system;

wherein:

the dependency model includes a data object for each component in the source operating system, each data object potentially having one or more Exports that provide data to at least one other component, and one or more Hard References that use data from at least one other component; and the means for utilizing the dependency model to select components from the source operating system further comprises:

means for identifying a selection of an operating system feature;

means for identifying one or more first operating system components mapped from the selected feature;

means for, for each identified first operating system component, tracing each Hard Reference from the identified component to a component Export from a second operating system component that resolves the Hard Reference and selecting the second operating system component;

means for, if the second operating system component includes one or more Hard References then, for each Hard Reference, tracing the Hard Reference from the second operating system component to a component Export from a third operating system component that resolves the Hard Reference and selecting the third operating system component; and means for repeatedly tracing Hard References and selecting components in a like manner until all Hard References from all components have been resolved and the components that contain the Hard References and the Exports that resolve them have been selected.

26. The system as recited in claim 25, wherein the Hard References are References that reference data from at least one other component that is critical to the function of the component represented by the data object in which the Hard Reference is included, and each data object potentially having one or more Soft References that are References that reference data that is not critical to the function of the component represented by the data object in which the Soft Reference is included.

27. A computer system comprising:

means for identifying a selected feature of a source operating system to be included in a target operating system;

means for identifying one or more first source operating system components that are associated with the selected feature, the one or more first source operating system components being required for the selected feature to function properly;

means for selecting the one or more first source operating system components;

means for identifying one or more second source operating system components that are required for the one or more first source operating system components to function properly;

means for selecting the one or more second source operating system components; and means for linking the selected source operating system components to form a target operating system;

wherein:

each source operating system component is represented by a data object;

a data object further comprises:
  a Name;
  a Type;
  one or more Exports that identify a source operating system component or components, if any, that requires data from the source operating system component represented by the data object;
  one or more Hard References that identify a source operating system component or components, if any, that provides critical data to the source operating system component represented by the data object; and the means for identifying first and second source operating system components each further comprises means for using a dependency model to trace each Hard Reference from a first data object that represents a first source operating system component to an Export from a second data object that represents a second source operating system component to identify the second source operating system component.

28. The system as recited in claim 27, the data object further comprising one or more Soft References, each Soft Reference identifying a source operating system component that provides data to the data object, the data provided to the data object being non-critical to the functioning of the source operating system component represented by the data object.

29. The system as recited in claim 27, the data object further comprising one or more Independent Links that each identifies a Reference and/or Export that is contained in a data structure that includes more than one Reference and/or Export.

30. The system as recited in claim 27, wherein the dependency model includes all the data objects that represent the source operating system components, and wherein each Hard Reference of each data object is logically connected to a data object Export that resolves the Hard Reference.

* * * * *